United States Patent
Park et al.

(10) Patent No.: US 11,444,671 B2
(45) Date of Patent: Sep. 13, 2022

(54) METHOD FOR MULTICAST TRANSMISSION BASED ON CHANNEL FEEDBACK

(71) Applicant: Samsung Electronics Co., Ltd., Suwon-si (KR)

(72) Inventors: Kwonyeol Park, Hwaseong-si (KR); Dongwoo Kim, Suwon-si (KR); Minho Shin, Seoul (KR); Changho Shin, Seoul (KR); Jonghun Rhee, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 215 days.

(21) Appl. No.: 16/747,956

(22) Filed: Jan. 21, 2020

(65) Prior Publication Data

US 2021/0028845 A1   Jan. 28, 2021

(30) Foreign Application Priority Data

Jul. 22, 2019   (KR) ........................ 10-2019-0088524

(51) Int. Cl.
  *H04B 7/06*   (2006.01)
  *H04L 12/18*   (2006.01)
  *H04L 1/00*   (2006.01)
  *H04W 4/06*   (2009.01)
  *H04L 5/00*   (2006.01)
  *H04W 52/16*   (2009.01)

(52) U.S. Cl.
  CPC ........... *H04B 7/0632* (2013.01); *H04B 7/063* (2013.01); *H04L 1/0026* (2013.01); *H04L 5/0057* (2013.01); *H04L 12/1845* (2013.01); *H04W 4/06* (2013.01); *H04W 52/16* (2013.01)

(58) Field of Classification Search
  CPC .................................................... H04B 7/0632
  See application file for complete search history.

(56) References Cited

U.S. PATENT DOCUMENTS

| | | | |
|---|---|---|---|
| 7,974,242 B2 | 7/2011 | Yang et al. |
| 8,175,045 B2 | 5/2012 | Roh et al. |
| 8,265,012 B2 | 9/2012 | Jung et al. |
| 8,369,860 B2 | 2/2013 | Zhang et al. |
| 8,514,820 B2 | 8/2013 | Cai et al. |
| 8,515,443 B2 | 8/2013 | Kim et al. |

(Continued)

FOREIGN PATENT DOCUMENTS

| | | |
|---|---|---|
| KR | 10-1388360 B1 | 4/2014 |
| KR | 10-2017-0115519 A | 10/2017 |

(Continued)

*Primary Examiner* — Ayanah S George
(74) *Attorney, Agent, or Firm* — Harness, Dickey & Pierce, P.L.C.

(57) ABSTRACT

A method of receiving multicast transmission from a base station includes receiving allocation information about a feedback channel including a plurality of resources shared by another terminal, determining feedback information based on an estimated channel with the base station, determining a plurality of transmission power levels respectively corresponding to the plurality of resources based on the feedback information, and transmitting channel feedback to the base station on the feedback channel based on the plurality of transmission power levels.

19 Claims, 14 Drawing Sheets

(56) References Cited

U.S. PATENT DOCUMENTS

| | | |
|---|---|---|
| 8,605,610 B2 | 12/2013 | Hwang et al. |
| 9,209,933 B2 | 12/2015 | Damnjanovic et al. |
| 9,438,404 B2 | 9/2016 | Shrivastava et al. |
| 9,519,807 B1* | 12/2016 | Langhammer ........... G06F 21/76 |
| 10,251,155 B2 | 4/2019 | Gupta et al. |
| 2003/0112880 A1* | 6/2003 | Walton .................. H04L 1/0015 |
| | | 375/260 |
| 2010/0232339 A1* | 9/2010 | Jung ..................... H04L 1/1692 |
| | | 370/312 |
| 2013/0286959 A1 | 10/2013 | Lou et al. |
| 2015/0072718 A1* | 3/2015 | Huang ................ H04W 52/241 |
| | | 455/522 |
| 2016/0066356 A1* | 3/2016 | Lindoff ............. H04W 72/1257 |
| | | 370/329 |
| 2016/0191201 A1 | 6/2016 | Park et al. |
| 2017/0353273 A1 | 12/2017 | Zhang et al. |

FOREIGN PATENT DOCUMENTS

| | | | |
|---|---|---|---|
| KR | 10-2018-0101373 A | 9/2018 | |
| WO | WO-2010059085 A1 * | 5/2010 | .......... H04W 52/327 |

* cited by examiner

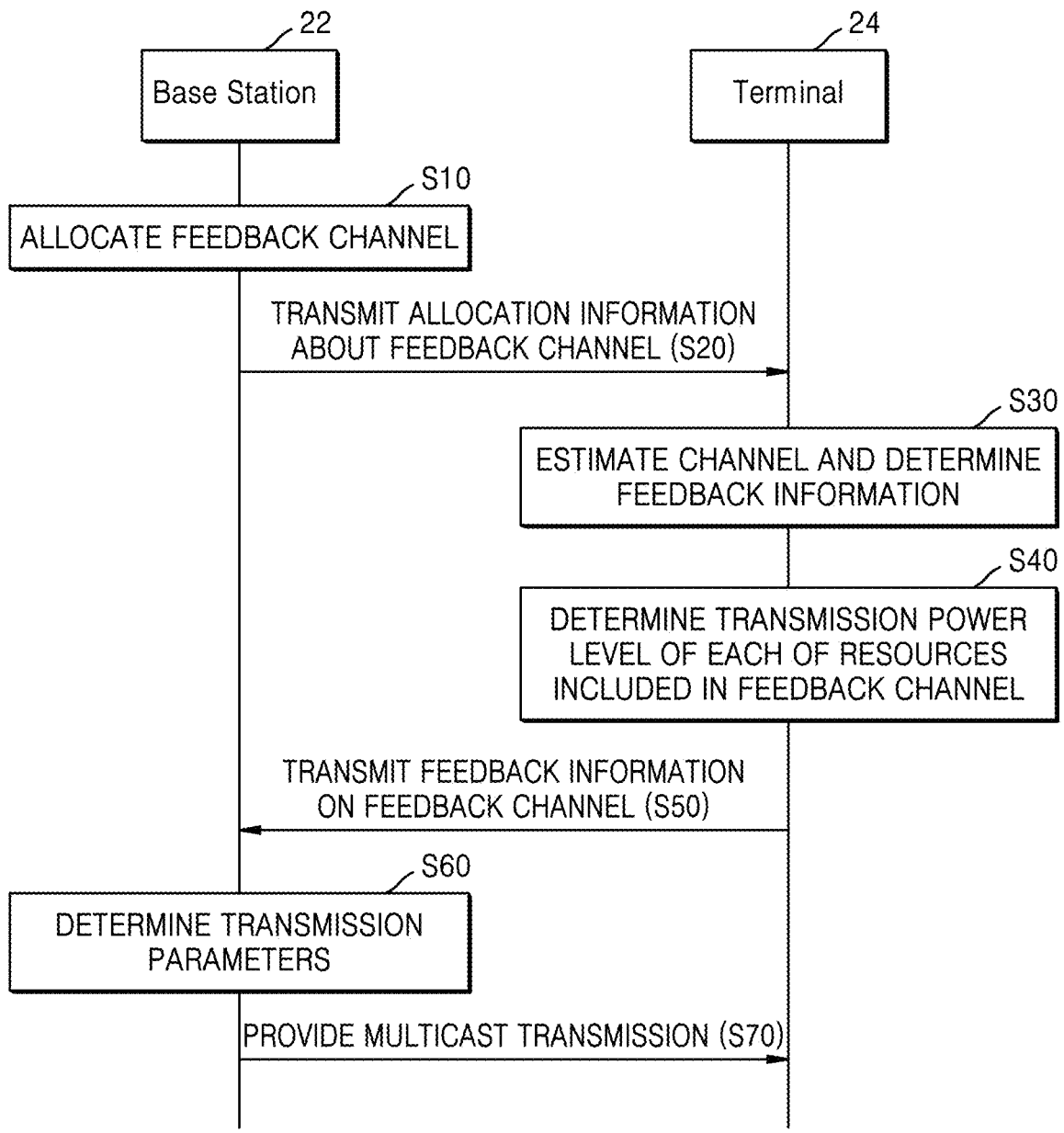

FIG. 3A
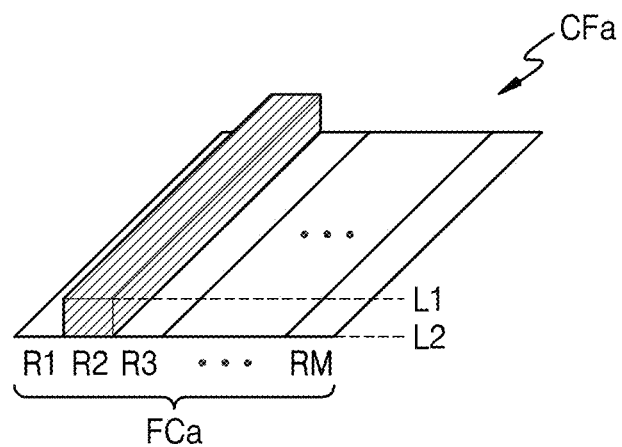
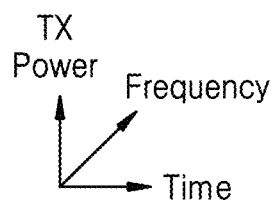
FIG. 3B
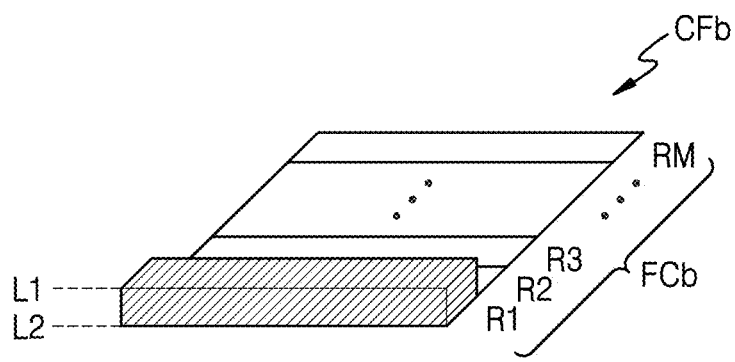
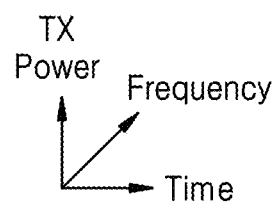

| CQI index | Modulation | code rate x 1024 | efficiency |
|---|---|---|---|
| 0 | out of range | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

FIG. 5B

T_MCS

| MCS Index | Modulation Order | Target code Rate x [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

METHOD FOR MULTICAST TRANSMISSION BASED ON CHANNEL FEEDBACK

CROSS-REFERENCE TO RELATED APPLICATION

This application claims the benefit of Korean Patent Application No. 10-2019-0088524, filed on Jul. 22, 2019, in the Korean Intellectual Property Office, the disclosure of which is incorporated herein in its entirety by reference.

BACKGROUND

Example embodiments of the inventive concepts relate to wireless communication. For example, at least some example embodiments relate to a method and/or apparatus for multicast transmission based on channel feedback.

Multicast may denote group communication for transmitting data to a plurality of devices included in the same group. For example, multicast in wireless communication may denote that a base station communicates with a plurality of terminals included in the same group (or a multicast group) in common. In order for the plurality of terminals of the multicast group to validly receive multicast transmission, the base station may determine transmission parameters for the multicast transmission. For example, the transmission parameters may be determined based on conditions of a plurality of channels between the base station and the plurality of terminals, and the conditions of the plurality of channels may be obtained from channel feedbacks provided from the plurality of terminals. Also, even when a new terminal subscribes to a multicast group or an existing terminal cancels a subscription to the multicast group, the base station may determine transmission parameters again. Therefore, overhead for determining a transmission parameter may affect the efficiency of multicast transmission.

SUMMARY

Example embodiments of the inventive concepts provide a method and/or apparatus for multicast transmission based on efficient channel feedback in wireless communication.

According to an example embodiment of the inventive concepts, there is provided a method of operating a terminal to receive multicast transmission from a base station, the method including receiving allocation information associated with a feedback channel, the feedback channel including a plurality of resources shared with another terminal; determining feedback information based on an estimated channel with the base station; determining, based on the feedback information, a plurality of transmission power levels corresponding to the plurality of resources shared with the another terminal, respectively; transmitting channel feedback to the base station on the feedback channel, the channel feedback based on the plurality of transmission power levels; and receiving the multicast transmission from the base station, the channel feedback being utilized by the base station to provide the multicast transmission to the terminal and the another terminal.

According to another example embodiment of the inventive concepts, there is provided a method of operating a terminal to provide a base station with channel feedback for multicast transmission, the method including receiving allocation information associated with a feedback channel, the feedback channel including M resources shared with another terminal, wherein M is an integer of more than 1; determining feedback information based on an estimated channel with the base station; encoding the feedback information as an M-bit string; setting, based on the M-bit string, a transmission power level of respective ones of the M resources as a first transmission power level or a second transmission power level; and transmitting channel feedback to the base station on the feedback channel based on the transmission power level of each of the M resources, the channel feedback being utilized by the base station to provide the multicast transmission to the terminal and the another terminal.

According to another example embodiment of the inventive concepts, there is provided a method of providing multicast transmission to a plurality of terminals, the method including providing the plurality of terminals with allocation information associated with a feedback channel, the feedback channel including a plurality of resources shared with the plurality of terminals; simultaneously receiving, over the feedback channel, a plurality of channel feedbacks from the plurality of terminals; determining a transmission parameter based on a plurality of reception power accumulated in the plurality of resources using the plurality of channel feedbacks; and providing the multicast transmission to the plurality of terminals based on the transmission parameter.

BRIEF DESCRIPTION OF THE DRAWINGS

Example embodiments of the inventive concepts will be more clearly understood from the following detailed description taken in conjunction with the accompanying drawings in which:

FIG. 2 is a flowchart illustrating a method for multicast transmission according to an example embodiment;

FIGS. 3A and 3B are diagrams illustrating examples of a feedback channel according to an example embodiment;

FIGS. 5A and 5B are tables applied to a wireless communication system according to embodiments;

FIGS. 8A and 8B are tables showing examples of transmission power levels of resources corresponding to feedback information according to embodiments;

DETAILED DESCRIPTION

Figure 1:
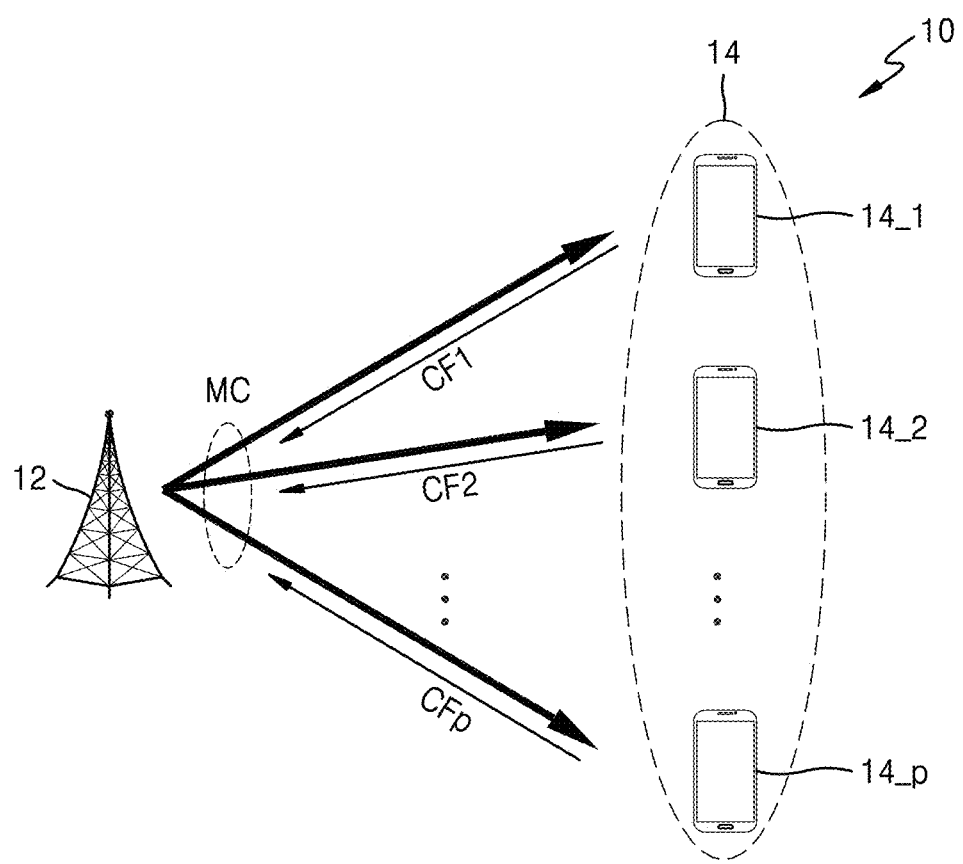
FIG. 1 is a diagram illustrating a wireless communication system according to an example embodiment.

FIG. 1 is a diagram illustrating a wireless communication system 10 according to an example embodiment.

Referring to FIG. 1, the wireless communication system 10 may include a base station 12 and a multicast group 14.

As a non-limiting example, the wireless communication system 10 may be a wireless communication system using a cellular network such as a $5^{th}$ generation (5G) wireless system, a long term evolution (LTE) system, an LTE-advanced system, a code division multiple access (CDMA) system, a global system for mobile communication (GSM) system, or may be a wireless personal area network (WPAN) system or another arbitrary wireless communication system. Hereinafter, an example where the wireless communication system 10 uses a cellular network will be mainly described, but it may be understood that example embodiments are not limited thereto.

The wireless communication system 10 may support unicast, multicast, and/or broadcast, and particularly, the wireless communication system 10 for supporting multicast and broadcast may be referred to as supporting multicast/broadcast services or multimedia broadcast multicast services (MBMS). For example, unicast transmission may denote transmission provided from a base station 12 to a terminal (for example, 14_1), multicast transmission may denote transmission provided from the base station 12 to a plurality of terminals of one group (i.e., a multicast group (for example, 14)), and broadcast transmission may denote transmission provided from the base station 12 to a plurality of terminals of a multicast group (for example, 14) and a plurality of terminals of another multicast group.

Unicast transmission may be provided based on transmission parameters which are determined to ensure valid reception by a terminal. On the other hand, in a multicast/broadcast service, transmission may be provided based on transmission parameters which are determined to ensure valid receptions by a plurality of terminals, and thus, transmission parameters (for example, a modulation order, a code rate, etc.) may be determined based on a worst channel among channels associated with a plurality of terminals. In the multicast/broadcast service, a plurality of channel conditions formed by the base station 12 and a plurality of terminals may differ and may be frequently changed. Conventionally, it may be difficult for a base station to efficiently obtain the plurality of channel conditions, thus increasing overhead for determining transmission parameters and reducing the efficiency of the multicast/broadcast service.

In contrast, in one or more example embodiments, the base station 12, as described below with reference to the drawings, may simultaneously obtain a plurality of channel conditions, used for determination of transmission parameters in the multicast/broadcast service, on a feedback channel shared by a plurality of terminals, instead of obtaining the channel conditions from the plurality of terminals and may obtain a worst channel condition (i.e., a lowest channel condition). Therefore, the efficiency of the multicast/broadcast service may be considerably enhanced, and particularly, transmission parameters for multicast transmission MC may be determined within a certain time regardless of a variation of the number of terminals included in a multicast group 14, which receives the multicast transmission MC.

Hereinafter, in example embodiments, multicast transmission will be mainly described, but it may be understood that example embodiments apply to broadcast transmission. Also, in embodiments, an example where a base station provides multicast transmission to a plurality of terminals will be mainly described, but it may be understood that example embodiments apply to multicast transmission provided from one terminal to other terminals.

The base station 12 may denote a fixed station which communicates with a terminal and/or another base station generally, and by communicating with a terminal and/or another base station, the base station 12 may exchange data and control information and may be referred to as a network access device. For example, the base station 12 may be referred to as a Node B, an evolved-Node B (eNB), a next generation Node B (gNB), a sector, a site, a base transceiver system (BTS), an access point (AP), a relay node, a remote radio head (RRH), a radio unit (RU), or a small cell. Herein, a base station or a cell may be construed as a comprehensive meaning which represents a function or a certain area covered by a base station controller (BSC) in CDMA, a Node-B in WCDMA, an eNB in LTE, or a 5G gNB or sector (site), and may include various coverage areas such as a communication range of each of a mega cell, a macro cell, a micro cell, a pico cell, a Femto cell, a relay node, an RRH, an RU, and a small cell.

The terminal (for example, 14_1) may be a wireless communication apparatus, and may be stationary or mobile and may denote an arbitrary device for transmitting and receiving data and/or control information by performing wireless communication with the base station 12. For example, a terminal may be referred to as user equipment (UE), terminal equipment, a mobile station (MS), a mobile terminal (MT), a user terminal (UT), a subscriber station (SS), a wireless device, or a handheld device.

The multicast group 14 may include first to $p^{th}$ terminals 14_1 to 14_p (where p is an integer of more than 1), and the first to $p^{th}$ terminals 14_1 to 14_p may receive the multicast transmission MC from the base station 12. The base station 12 may receive first to $p^{th}$ channel feedbacks CF1 to CFp respectively from the first to $p^{th}$ terminals 14_1 to 14_p, for determining transmission parameters for the multicast transmission MC. For example, as illustrated in FIG. 1, the first terminal 14_1 may provide the first channel feedback CF1 to the base station 12, the second terminal 14_2 may provide the second channel feedback CF2 to the base station 12, and the $p^{th}$ terminal 14_p may provide the $p^{th}$ channel feedback CFp to the base station 12.

The first to $p^{th}$ channel feedbacks CF1 to CFp may be transmitted to the base station 12 on a feedback channel shared by the first to $p^{th}$ terminals 14_1 to 14_p. For example, the first terminal 14_1 may determine feedback information based on a channel estimated based on the base station 12 and may control transmission power levels of resources included in a feedback channel so that the first channel feedback CF1 represents the determined feedback information. Similarly, each of the second to $p^{th}$ terminals 14_2 to 14_p may control transmission power levels of resources included in a feedback channel based on feedback information. The base station 12 may receive combined channel feedback (for example, CFs of FIG. 4) from the first to $p^{th}$ terminals 14_1 to 14_p and may determine the transmission parameters for the multicast transmission MC based on the combined channel feedback. For example, the base station 12 may determine a lowest channel condition (i.e., a condition of a worst channel) among conditions of channels between the base station 12 and the first to $p^{th}$ terminals 14_1 to 14_p based on the combined channel feedback and may determine transmission parameters based on the lowest channel condition. Examples of the combined channel feedback will be described below with reference to FIGS. 4, 11A, 11B, 12A, and 12B.

FIG. 2 is a flowchart illustrating a method for multicast transmission according to an example embodiment. In detail, the flowchart of FIG. 2 may represent operations of a base station 22 and a terminal 24 over time. In some example embodiments, the base station 22 may be an example of the base station 12 of FIG. 1, and the terminal 24 may be an example of a terminal included in the multicast group 14 of FIG. 1.

Referring to FIG. 2, in operation S10, the base station 22 may perform an operation of allocating a feedback channel. For example, the base station 22 may allocate a plurality of resources to a feedback channel for receiving channel feedback. Herein, a resource may be a unit capable of being independently controlled by a wireless communication apparatus (i.e., the base station 22 or the terminal 24) and may be referred to as a time-frequency resource, and a feedback channel may include a plurality of resources which are successive in a time domain and/or a frequency domain. Examples of a feedback channel will be described below with reference to FIGS. 3A and 3B. In some example embodiments, the base station 22 may manage a plurality of multicast groups and may allocate a plurality of feedback channels to each of the plurality of multicast groups. Examples where the base station 22 manages a plurality of multicast groups will be described below with reference to FIGS. 13 and 14.

In operation S20, the base station 22 may transmit allocation information about a feedback channel to the terminal 24. For example, multicast transmission may be provided on a multicast channel MCH, and the multicast channel MCH may include a multicast traffic channel MTCH and a multicast control channel MCCH. In some example embodiments, the base station 22 may provide the allocation information about the feedback channel on the multicast control channel MCCH. The allocation information about the feedback channel may represent locations and configurations (for example, the number) of resources allocated to a feedback channel for a multicast group including the terminal 24, and in addition to the terminal 24, other terminals included in the multicast group including the terminal 24 may receive the allocation information about the feedback channel from the base station 22.

In operation S30, the terminal 24 may determine channel estimation information and feedback information. For example, the terminal 24 may estimate a channel (or a channel status or a channel condition) based on signals (for example, reference signals) transmitted by the base station 22. The terminal 24 may determine feedback information, which is to be provided to the base station 22, based on the estimated channel, and for example, the feedback information may include channel-status information (CSI). In some example embodiments, as described below with reference to FIG. 5A, feedback information may include channel quality indication (CQI). In some example embodiments, as described below with reference to FIG. 5B, feedback information may include a modulation coding scheme (MCS). Also, in some example embodiments, feedback information may include a rank indicator (RI) and precoder matrix indication (PMI).

In operation S40, the terminal 24 may determine a transmission power level of each of resources included in the feedback channel. The terminal 24 may control the transmission power levels of the resources included in the feedback channel, for representing at least a portion of the feedback information which is determined in operation S30. To this end, when the feedback channel includes M (where M is an integer of more than 1) resources, the terminal 24 may encode the feedback information as an M-bit string and may determine transmission power levels of the M resources based on the encoded M-bit string. Each of the terminals included in the multicast group may encode feedback information according to the same encoding scheme. In some example embodiments, in operation S20, the base station 22 may transmit allocation information about a feedback channel, including an encoding scheme, to the terminal 24. Therefore, the terminal 24 may extract an encoding scheme from the allocation information about the feedback channel and may encode the feedback information according to the extracted encoding scheme. As described below with reference to FIGS. 7A, 7B, 8A, and 8B, an encoding scheme which enables the base station 22 to obtain combined feedback information based on accumulated reception power of resources included in a feedback channel may be adopted. Examples of operation S40 will be described below with reference to FIGS. 6 and 10.

In operation S50, the terminal 24 may transmit the feedback information to the base station 22 on the feedback channel. That is, the terminal 24 may transmit channel feedback to the base station 22. For example, the terminal 24 may transmit the feedback information to the base station 22 on the feedback channel based on the transmission power levels which are determined in operation S40, and the feedback information may be represented by a combination of transmission power of resources included in the feedback channel.

In operation S60, the base station 22 may determine transmission parameters. The base station 22 may receive combined channel feedback from channel feedbacks transmitted by a plurality of terminals including the terminal 24 and may determine the transmission parameters based on the combined channel feedback. For example, the base station 22 may detect a lowest channel condition from among channel conditions based on the terminals included in the multicast group, based on the combined channel feedback and may determine transmission parameters (for example, a modulation order, a code rate, etc.) corresponding to the lowest channel condition.

In operation S70, the base station 22 may provide multicast transmission. For example, the base station 22 may provide the multicast transmission to the terminal 24 and other terminals each included in the multicast group based on the transmission parameters which are determined in operation S60. Therefore, all terminals included in the multicast group may validly receive the multicast transmission.

FIGS. 3A and 3B are diagrams illustrating examples of a feedback channel according to an example embodiment. In detail, FIG. 3A illustrates available channel feedback CFa in a feedback channel FCa including a plurality of resources divided in a time domain, and FIG. 3B illustrates available channel feedback CFb in a feedback channel FCb including a plurality of resources divided in a frequency domain. As described above with reference to FIGS. 1 and 2, the feedback channel FCa of FIG. 3A or the feedback channel FCb of FIG. 3B may be shared by terminals included in the same multicast group. Hereinafter, a repetitive description among descriptions of FIGS. 3A and 3B will be omitted.

Referring to FIG. 3A, the feedback channel FCa may include first to $M^{th}$ (where M is an integer of more than 1) resources R1 to RM divided in the time domain. As illustrated in FIG. 3A, the first to $M^{th}$ resources R1 to RM may each have a certain width in a frequency axis and may be continuously disposed in a time axis. Each of the first to $M^{th}$ resources R1 to RM may have a first transmission power level L1 or a second transmission power level L2 based on feedback information. For example, as illustrated in FIG. 3A, in the channel feedback CFa, the second resource R2 may have the first transmission power level L1, which is higher than the second transmission power level L2, and the other resources including the first, third, and $M^{th}$ resources R1, R3, and RM may have the second transmission power level L2. The channel feedback CFa may be expressed as an M-bit string '010 . . . 0'. Herein, it may be assumed that the second transmission power level L2 is zero and the first transmission power level L1 is higher than the second transmission power level L2.

Referring to FIG. 3B, the feedback channel FCb may include first to $M^{th}$ (where M is an integer of more than 1) resources R1 to RM divided in the frequency domain. As illustrated in FIG. 3B, the first to $M^{th}$ resources R1 to RM may each have a certain width in a time axis and may be continuously disposed in a frequency axis. Each of the first to $M^{th}$ resources R1 to RM may have a first transmission power level L1 or a second transmission power level L2 based on feedback information. For example, as illustrated in FIG. 3B, in the channel feedback CFb, the first resource R1 may have the first transmission power level L1, and the other resources including the second, third, and $M^{th}$ resources R2, R3, and RM may have the second transmission power level L2. The channel feedback CFb may be expressed as an M-bit string '100 . . . 0'.

Figure 4:
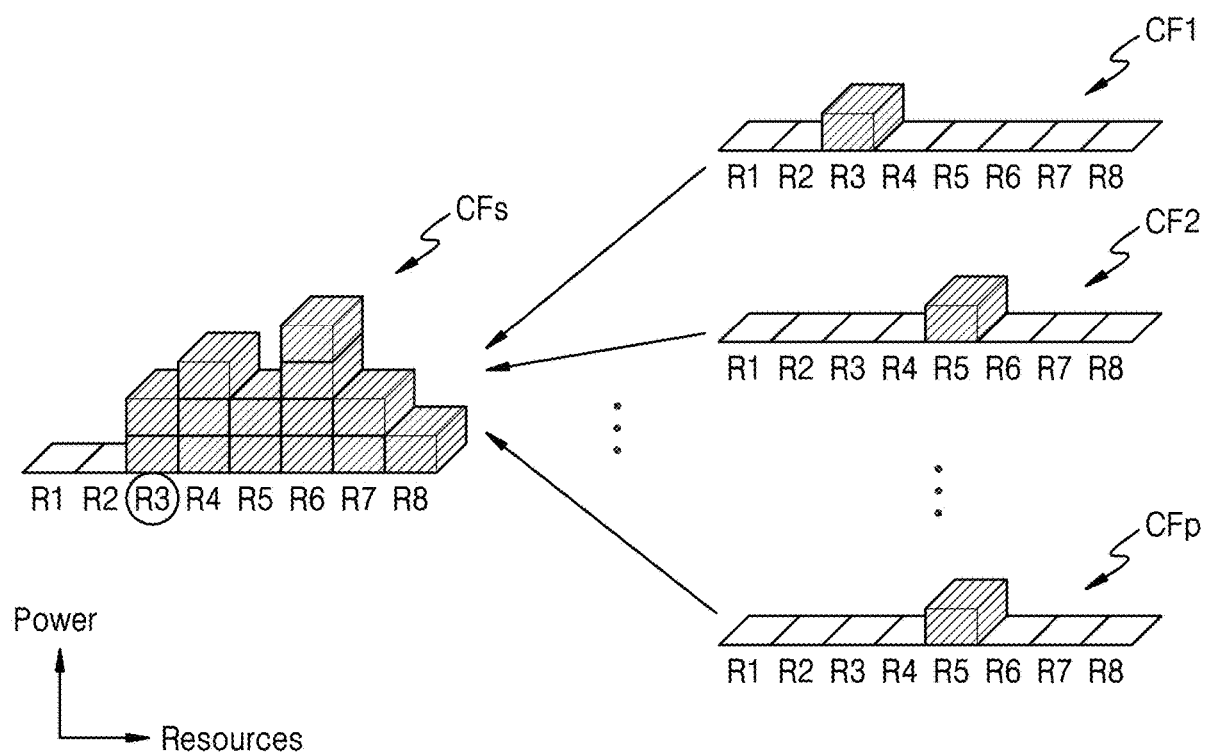
FIG. 4 is a diagram illustrating an example of combined channel feedback according to an example embodiment.

FIG. 4 is a diagram illustrating an example of combined channel feedback according to an example embodiment. In detail, FIG. 4 illustrates an example where the base station 12 of FIG. 1 receives combined channel feedback CFs from the first to $p^{th}$ terminals 14_1 to 14_p included in the multicast group 14. In FIG. 4, it may be assumed that a feedback channel includes eight resources. Hereinafter, FIG. 4 will be described with reference to FIG. 1.

Each of the first to $p^{th}$ terminals 14_1 to 14_p included in the multicast group 14 may transmit channel feedback to the base station 12 based on feedback information, and the feedback information may represent that an estimated channel is poor as an index of a resource, having a first transmission power level, of the first to eighth resources R1 to R8 decreases. For example, as illustrated in FIG. 4, when the third resource R3 has the first transmission power level in a first channel feedback CF1 and the fifth resource R5 has the first transmission power level in a second channel feedback CF2, this may represent that a channel condition between the base station 12 and the first terminal 14_1 is worse than a channel condition between the base station 12 and the second terminal 14_2.

In the combined channel feedback CFs, due to first to $p^{th}$ channel feedbacks CF1 to CFp, the first to eighth resources R1 to R8 may have accumulated reception power as illustrated in FIG. 4. As described above with reference to FIGS. 1 and 2, in order to detect a lowest channel condition from among conditions of a plurality of channels, the base station 12 may detect a resource corresponding to a minimum index from among resources having a reception power level which is equal to or higher than the first transmission power level.

For example, as illustrated in FIG. 4, in any channel feedback of the first to $p^{th}$ channel feedbacks CF1 to CFp, the first resource R1 or the second resource R2 may not have the first transmission power level, and thus, the base station 12 may detect the third resource R3 and may detect a lowest channel condition corresponding to the third resource R3. The first to $p^{th}$ channel feedbacks CF1 to CFp may be generated based on one-hot encoding, and as described below with reference to FIGS. 7B, 8A, and 8B, in some example embodiments, channel feedback may be generated based on an encoding scheme differing from the illustration of FIG. 4, whereby the lowest channel condition may be detected based on different encoding schemes.

Although it is illustrated in FIG. 4 that the first transmission power levels output from the first to $p^{th}$ terminals 14_1 to 14_p are accumulated in the combined channel feedback CFs for convenience of illustration, a reception power level transferred to the base station 12 may differ from a level obtained by accumulating the first transmission power level, due to channels between the base station 12 and the first to $p^{th}$ terminals 14_1 to 14_p. Also, despite different conditions of channels, the first transmission power level of each of the first to $p^{th}$ terminals 14_1 to 14_p may be received by the base station 12 as a reception power level having the same level, in order for the base station 12 to detect a lowest channel condition. Therefore, each of the first to $p^{th}$ terminals 14_1 to 14_p may determine the first transmission power level based on a channel condition, and thus, the first transmission power level may differ for each of the first to $p^{th}$ terminals 14_1 to 14_p. An operation of determining, by using a terminal, the first transmission power level will be described below with reference to FIGS. 9 and 10.

Figure 5A:
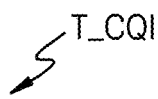

FIGS. 5A and 5B are tables applied to a wireless communication system according to embodiments. In detail, FIG. 5A shows one CQI table T_CQI of CQI tables prescribed in 5G NR, and FIG. 5B shows one MCS table T_MCS of MCS tables prescribed in 5G NR. Hereinafter, FIGS. 5A and 5B will be described with reference to FIGS. 2 and 4.

Referring to FIG. 5A, in some example embodiments, feedback information may include a CQI index. As illustrated in FIG. 5A, the CQI index may define a modulation order and a code rate, and a relatively high CQI index may correspond to a relatively high modulation order and code rate. The terminal 24 may transmit the CQI index, corresponding to a maximally supportable modulation order and code rate, as the feedback information to the base station 22 on a feedback channel based on an estimated channel, and the base station 12 may detect a minimum CQI index from among CQI indexes received from a plurality of terminals including the terminal 24 to detect a lowest channel condition. As illustrated in FIG. 5A, in the CQI table T_CQI, the CQI index may have one value among sixteen different values, and thus, as described below with reference to FIGS. 7A, 7B, 8A, and 8B, when the feedback information includes the CQI index, a feedback channel may include sixteen resources for representing the CQI index.

Referring to FIG. 5B, in some example embodiments, feedback information may include an MCS index. As illustrated in FIG. 5B, the MCS index may define a modulation order and a target code rate, and a relatively high MCS index may correspond to a relatively high modulation order and target code rate. The terminal 24 may transmit the MCS index, corresponding to a maximally supportable modulation order and target code rate, as the feedback information to the base station 22 on a feedback channel based on an estimated channel, and the base station 12 may detect a minimum MCS index from among MCS indexes received from a plurality of terminals including the terminal 24 to detect a lowest channel condition. As illustrated in FIG. 5B, in the MCS table T_MCS, the MCS index may have one value among thirty-two different values, and thus, when the feedback information includes the MCS index, a feedback channel may include thirty-two resources for representing the MCS index. Hereinafter, the CQI index will be described as feedback information, but it may be understood that example embodiments are not limited thereto.

Figure 6:
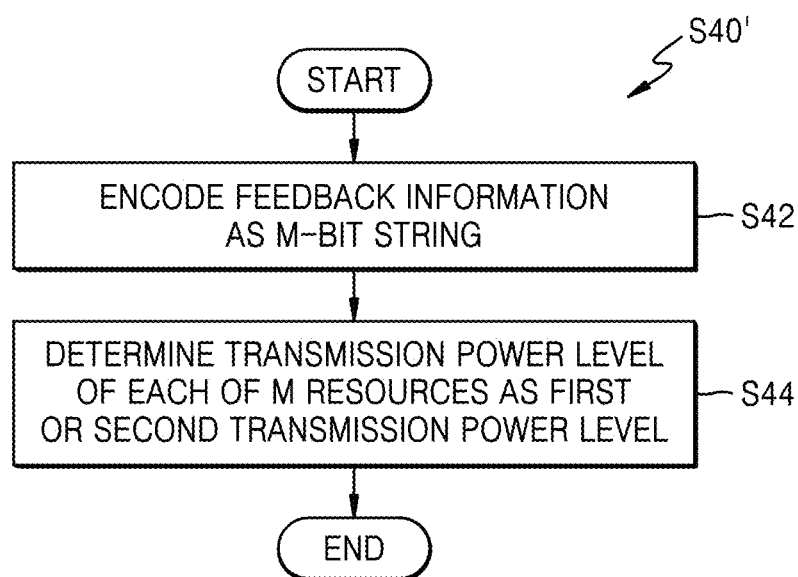
FIG. 6 is a flowchart illustrating a method for multicast transmission according to an example embodiment.

FIG. 6 is a flowchart illustrating a method for multicast transmission according to an example embodiment. In detail, the flowchart of FIG. 6 represents an example of operation S40 of FIG. 2. As described above with reference to FIG. 2, in operation S40' of FIG. 6, an operation of determining a transmission power level of each of resources included in a feedback channel may be performed, and as illustrated in FIG. 6, operation S40' may include operation S42 and operation S44. In some example embodiments, operation S40' may be performed by the terminal 24 of FIG. 2. Hereinafter, FIG. 6 will be described with reference to FIG. 2.

Referring to FIG. 6, in operation S42, an operation of encoding feedback information as an M-bit string may be performed. M may be determined based on the number of values of the feedback information, and bits of the M-bit string may respectively correspond to M resources included in the feedback channel. For example, M may be 16, for representing the sixteen CQI indexes included in the CQI table T_CQI of FIG. 5A. In some example embodiments, as described below with reference to FIGS. 7A and 7B, the feedback information may be encoded as the M-bit string based on one-hot encoding or one-cold encoding. Moreover, in some example embodiments, as described below with reference to FIGS. 8A and 8B, the feedback information may be encoded as the M-bit string based on unary coding.

In operation S44, an operation of determining a transmission power level of each of the M resources as a first transmission power level or a second transmission power level may be performed. For example, the terminal 24 may determine the transmission power level of each of the M resources included in the feedback channel based on the M-bit string obtained through encoding which is performed in operation S42. Herein, it may be assumed that a resource corresponding to a bit '1' of the M-bit string is determined to have the first transmission power level and a resource corresponding to a bit '0' of the M-bit string is determined to have the second transmission power level.

In some example embodiments, in a case where the M-bit string is encoded based on one-hot encoding, as described below with reference to FIG. 7A, one of a plurality of resources may have the first transmission power level based on the feedback information. Also, in some example embodiments, in a case where the M-bit string is encoded based on one-cold encoding, as described below with reference to FIG. 7B, one of a plurality of resources may have the second transmission power level based on the feedback information.

In some example embodiments, in a case where the M-bit string is encoded based on unary coding, as described below with reference to FIGS. 8A and 8B, at least one successive resource of a plurality of resources may have the first transmission power level or the second transmission power level based on the feedback information. In some example embodiments, the at least one resource having the first transmission power level or the second transmission power level may include a first resource (for example, R1 of FIG. 4) of the plurality of resources, and in some other example embodiments, may include a last resource (for example, R8 of FIG. 4) of the plurality of resources.

Figure 7A:
FIGS. 7A and 7B are tables showing examples of transmission power levels of resources corresponding to feedback information according to embodiments.
Figure 7B:

FIGS. 7A and 7B are tables showing examples of transmission power levels of resources corresponding to feedback information according to embodiments. In detail, a table of FIG. 7A may represent transmission power levels of resources corresponding to bit strings which are obtained by encoding the CQI indexes defined in the CQI table T_CQI of FIG. 5A based on one-hot encoding, and a table of FIG. 7B may represent transmission power levels of resources corresponding to bit strings which are obtained by encoding the CQI indexes defined in the CQI table T_CQI of FIG. 5A based on one-cold encoding. In FIGS. 7A and 7B, a resource having a first transmission power level may be shaded, and a resource having a second transmission power level may not be shaded.

Referring to FIG. 7A, the CQI index may be encoded as a 16-bit string based on one-hot encoding. For example, CQI indexes '0, 1, . . . , 14, and 15' may be respectively encoded as 16-bit strings '1000000000000000, 0100000000000000, . . . , 0000000000000010, and 0000000000000001'. Therefore, a transmission power level of each of sixteen resources may be determined as illustrated in FIG. 7A. In some example embodiments, unlike the illustration of FIG. 7A, CQI indexes '0, 1, . . . , 14, and 15' may be respectively encoded as 16-bit strings '0000000000000001, 0000000000000010, . . . , 0100000000000000, and 1000000000000000' based on one-hot encoding.

Referring to FIG. 7B, the CQI index may be encoded as a 16-bit string based on one-cold encoding. For example, the CQI indexes '0, 1, . . . , 14, and 15' may be respectively encoded as 16-bit strings '0111111111111111, 1011111111111111, . . . , 1111111111111101, and 1111111111111110'. Therefore, a transmission power level of each of sixteen resources may be determined as illustrated in FIG. 7B. In some example embodiments, unlike the illustration of FIG. 7B, the CQI indexes '0, 1, . . . , 14, and 15' may be respectively encoded as 16-bit strings '1111111111111110, 1111111111111101, . . . , 1011111111111111, and 0111111111111111' based on one-cold encoding.

Figures 8A, 8B:
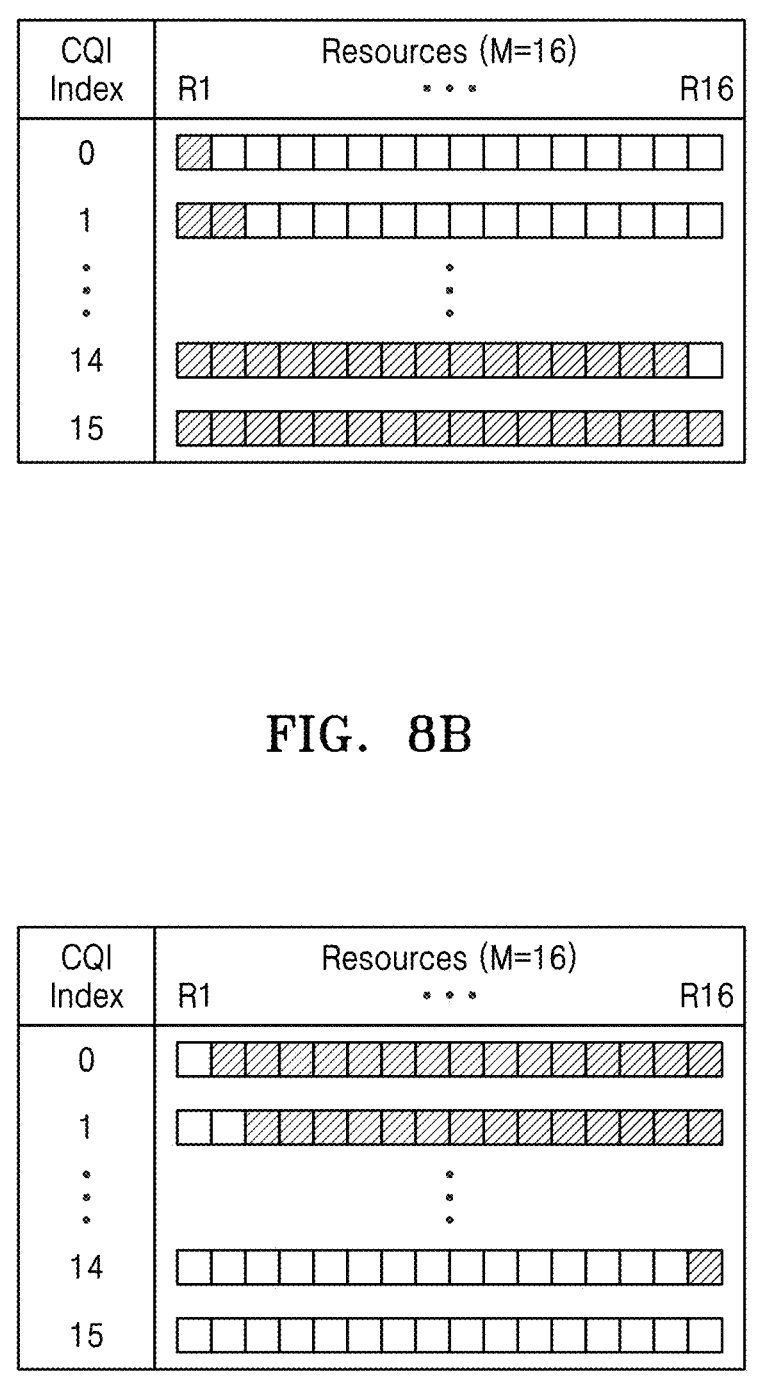

FIGS. 8A and 8B are tables showing examples of transmission power levels of resources corresponding to feedback information according to example embodiments. In detail, a table of FIG. 8A may represent transmission power levels of resources corresponding to bit strings which are obtained by encoding the CQI indexes defined in the CQI table T_CQI of FIG. 5A based on unary encoding and of which the number of bits '1' increases as the CQI index increases, and a table of FIG. 8B may represent transmission power levels of resources corresponding to bit strings which are obtained by encoding the CQI indexes defined in the CQI table T_CQI of FIG. 5A based on unary encoding and of which the number of bits '0' increases as the CQI index increases. In FIGS. 8A and 8B, a resource having a first transmission power level may be shaded and a resource having a second transmission power level may not be shaded. FIGS. 8A and 8B show some examples of unary coding, and it may be understood that other examples (for example, a generalized unary code) of unary coding may be implemented.

Referring to FIG. 8A, the CQI index may be encoded as a 16-bit string of which the number of bits '1' increases as the CQI index increases based on unary coding. For example, CQI indexes '0, 1, . . . , 14, and 15' may be respectively encoded as 16-bit strings '1000000000000000, 1100000000000000, ..., 1111111111111110, and 1111111111111111'. Therefore, a transmission power level of each of sixteen resources may be determined as illustrated in FIG. 8A. Referring to FIG. 8B, the CQI index may be encoded as a 16-bit string of which the number of bits '0' increases as the CQI index increases based on unary coding. For example, CQI indexes '0, 1, ..., 14, and 15' may be respectively encoded as 16-bit strings '0111111111111111, 0011111111111111, ..., 0000000000000001, and 0000000000000000'. Therefore, a transmission power level of each of sixteen resources may be determined as illustrated in FIG. 8B. The above-described unary coding of FIGS. 8A and 8B may be referred to as thermometer coding.

Figure 9:
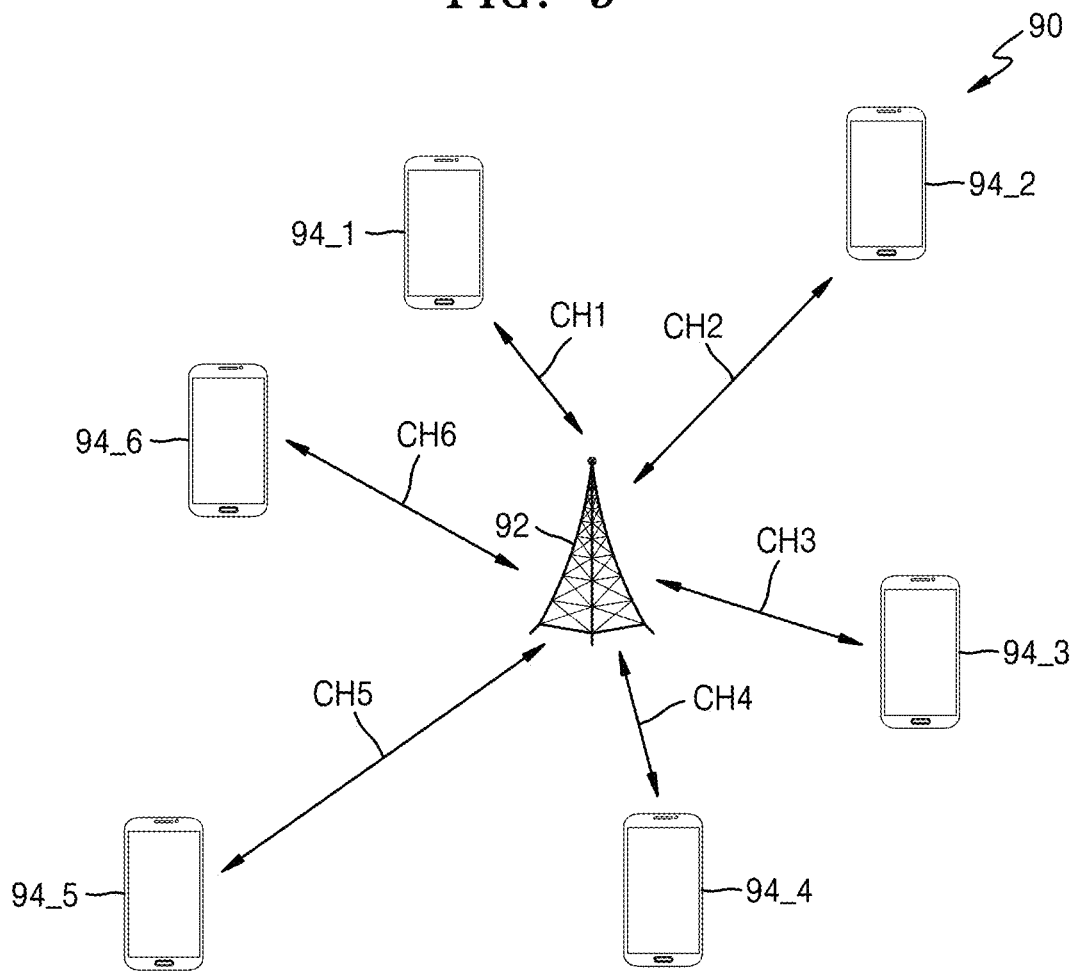
FIG. 9 is a diagram illustrating an example of channels formed by a base station and a plurality of terminals included in one multicast group according to an example embodiment.

FIG. 9 is a diagram illustrating an example of channels formed by a base station and a plurality of terminals included in one multicast group according to an example embodiment. As illustrated in FIG. 9, first to sixth terminals 94_1 to 94_6 included in the same multicast group 90 may respectively form first to sixth channels CH1 to CH6 along with a base station 92.

Conditions of the first to sixth channels CH1 to CH6 may differ due to various factors. For example, the conditions of the first to sixth channels CH1 to CH6 may depend on distances between the base station 92 and the first to sixth terminals 94_1 to 94_6, interference between channels, and obstacles between the base station 92 and the first to sixth terminals 94_1 to 94_6. Due to different channel conditions, transmission power output from the first to sixth terminals 94_1 to 94_6 on a feedback channel may differently attenuated until reaching the base station 92. It may be desirable that a transmission power level (i.e., a first transmission power level) of a resource for representing feedback information is received by the base station 92 at reception power having the same level as a level needed for the first to sixth terminals 94_1 to 94_6 regardless of the first to sixth channels CH1 to CH6, and thus, each of the first to sixth terminals 94_1 to 94_6 may determine the magnitude of the first transmission power level based on the first to sixth channels CH1 to CH6. An operation of determining, by using a terminal, the magnitude of the first transmission power level will be described below with reference to FIG. 10. It may be desirable that a second transmission power level is received by the base station 92 at reception power having the same level as a level needed for the first to sixth terminals 94_1 to 94_6 regardless of the first to sixth channels CH1 to CH6, but for convenience of description, it may be assumed that the second transmission power level or a reception power level, corresponding to the second transmission power level, of the base station 92 is zero.

Figure 10:
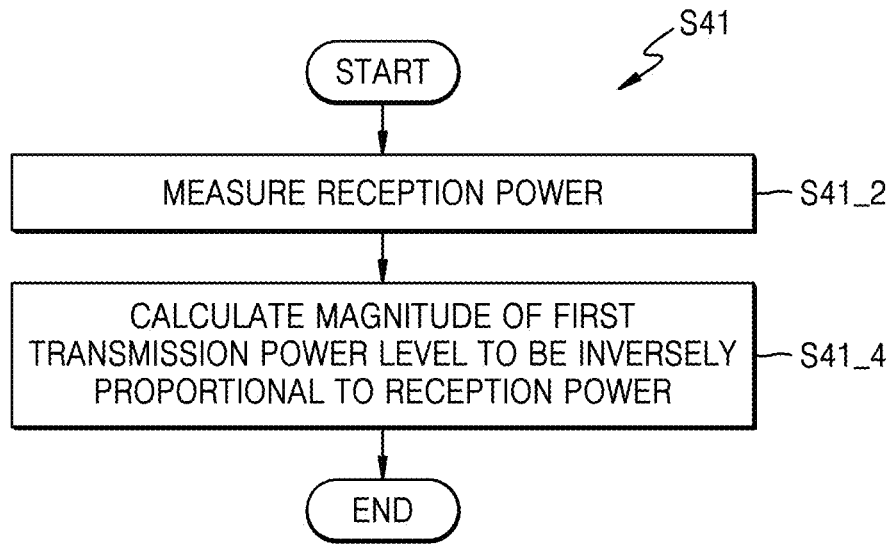
FIG. 10 is a flowchart illustrating a method for multicast transmission according to an example embodiment.

FIG. 10 is a flowchart illustrating a method for multicast transmission according to an example embodiment. In detail, the flowchart of FIG. 10 represents operation S41 of performing an operation of determining the magnitude of a first transmission power level, and in some example embodiments, operation S41 of FIG. 10 may be included in operation S40 of FIG. 2. As illustrated in FIG. 10, operation S41 may include operations S41_2 and S41_4. In some example embodiments, operation S41 may be performed by the terminal 24 of FIG. 2. Hereinafter, FIG. 10 will be described with reference to FIG. 2.

In operation S41_2, an operation of measuring reception power may be performed. For example, the terminal 24 may measure the reception power based on transmission (for example, reference signals) provided by the base station 22. When transmission power of the base station 22 is $P_T$ and an estimated channel between the base station 22 and the terminal 24 is $h_B$, reception power $P_R$ measured by the terminal 24 may be expressed as the following Equation (1).

$$P_R = P_T |h_B|^2 \quad \text{[Equation 1]}$$

Reception power measured by terminals included in a multicast group may differ due to different channel conditions despite the same transmission power $P_T$.

In operation S41_4, an operation of calculating the magnitude P of a first transmission power level so as to be inversely proportional to reception power may be performed. For example, the magnitude P of the first transmission power level may be expressed as the following Equation (2).

$$P = \frac{\alpha}{P_R} = \frac{\alpha}{P_T |h_B|^2} = \frac{\gamma}{|h_B|^2} \left( \gamma = \frac{\alpha}{P_T} \right) \quad \text{[Equation 2]}$$

In Equation (2), α may be determined based on a wireless communication environment of each of the base station 22 and the terminal 24, and for example, may be a value which is selected from among predefined values based on path loss, shading, a multipath, and an ambient environment.

In some example embodiments, as described above with reference to FIG. 7A, a CQI index may be encoded based on one-hot encoding, and in a case where the magnitude P of the first transmission power level is calculated as in Equation (2), a transmission power level $P_m$ of an $m^{th}$ resource $R_m$ in a feedback channel may be expressed as the following Equation (3) (1≤m≤M).

$$P_m = \begin{cases} \frac{\gamma}{|h_B|^2} & \text{for } m = CQI \text{ index} + 1 \\ 0 & \text{otherwise} \end{cases} \quad \text{[Equation 3]}$$

In some example embodiments, as described above with reference to FIG. 7B, a CQI index may be encoded based on one-cold encoding, and in a case where the magnitude P of the first transmission power level is calculated as in Equation (2), the transmission power level $P_m$ of the $m^{th}$ resource $R_m$ in the feedback channel may be expressed as the following Equation (4) (1≤m≤M).

$$P_m = \begin{cases} 0 & \text{for } m = CQI \text{ index} + 1 \\ \frac{\gamma}{|h_B|^2} & \text{otherwise} \end{cases} \quad \text{[Equation 4]}$$

In some example embodiments, as described above with reference to FIG. 8A, a CQI index may be encoded based on unary coding, and in a case where the magnitude P of the first transmission power level is calculated as in Equation (2), the transmission power level $P_m$ of the $m^{th}$ resource $R_m$ in the feedback channel may be expressed as the following Equation (5) (1≤m≤M).

$$P_m = \begin{cases} \frac{\gamma}{|h_B|^2} & \text{for } 1 \leq m \leq CQI \text{ index} + 1 \\ 0 & \text{otherwise} \end{cases} \quad \text{[Equation 5]}$$

In some example embodiments, as described above with reference to FIG. 8B, a CQI index may be encoded based on unary coding, and in a case where the magnitude P of the first transmission power level is calculated as in Equation (2), the transmission power level $P_m$ of the $m^{th}$ resource $R_m$ in the feedback channel may be expressed as the following Equation (6) ($1 \le m \le M$).

$$P_m = \begin{cases} 0 & \text{for } 1 \le m \le CQI \text{ index} + 1 \\ \dfrac{\gamma}{|h_B|^2} & \text{otherwise} \end{cases} \quad \text{[Equation 6]}$$

In a case where the magnitude P of the first transmission power level is calculated as in Equation (2), reception power $Q_m$, accumulated in the $m^{th}$ resource $R_m$, of the base station 22 in the feedback channel, may be expressed as the following Equation (7) ($1 \le m \le M$).

$$Q_m = \Sigma_{i \in L} |h_B|^2 P_m^i + N = \Sigma_{i \in L} \gamma + N \approx \gamma |L| \quad \text{[Equation 7]}$$

In Equation (7), L may denote a set of terminals which output transmission power having the first transmission power level in the $m^{th}$ resource $R_m$, $P_m^i$ may denote transmission power of the $m^{th}$ resource $R_m$ output from an $i^{th}$ terminal, and N may denote additive white Gaussian noise (AWGN). Examples of an operation of determining, by using the base station 22, a lowest channel condition based on accumulated reception power of resources in the feedback channel will be described below with reference to FIGS. 11A, 11B, 12A, and 12B.

Figure 11A:
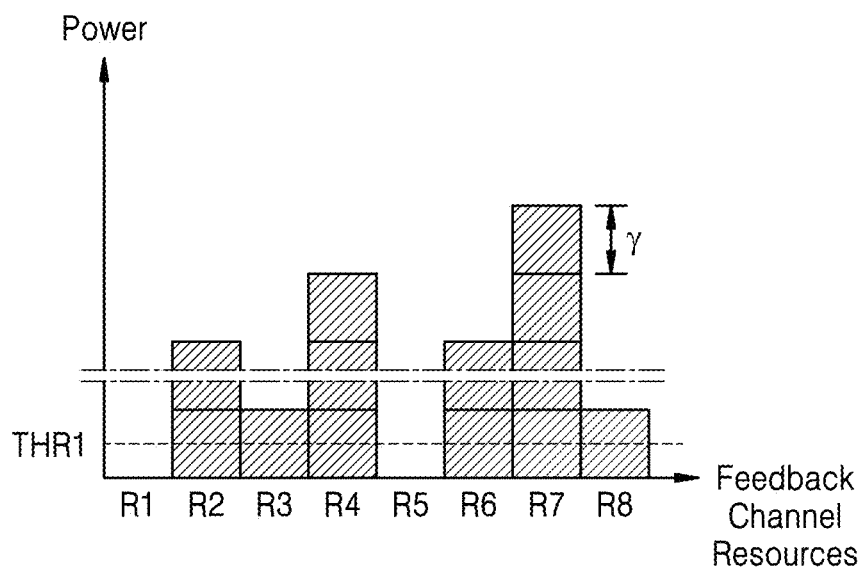
FIGS. 11A and 11B are graphs showing examples of combined channel feedback obtained by a base station according to an example embodiment.
Figure 11B:
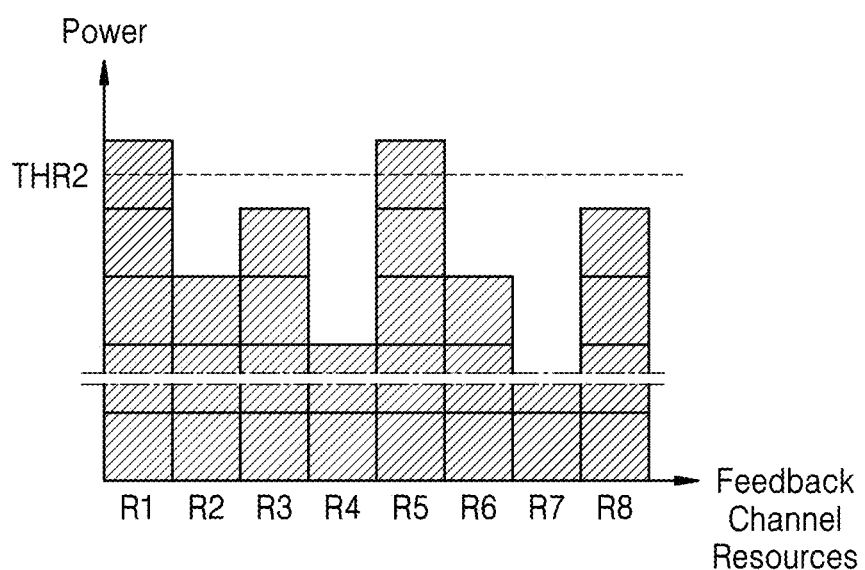

FIGS. 11A and 11B are graphs showing examples of combined channel feedback obtained by a base station according to an example embodiment. In detail, as described above with reference to FIG. 7A, the graph of FIG. 11A shows an example of combined channel feedback from channel feedbacks generated based on one-hot encoding, and as described above with reference to FIG. 7B, the graph of FIG. 11B shows an example of combined channel feedback from channel feedbacks generated based on one-cold encoding. The combined channel feedback of FIG. 11A and the combined channel feedback of FIG. 11B may be processed by the base station 12 of FIG. 1. Hereinafter, FIGS. 11A and 11B will be described with reference to FIG. 1.

Referring to FIG. 11A, the base station 12 may determine a location of a resource corresponding to a lowest channel condition from among resources having a reception power level which is higher than a first threshold value THR1 and may determine transmission parameters based on the determined location of the resource. For example, when channel feedbacks generated by the first to $p^{th}$ terminals 14_1 to 14_p based on one-hot encoding are accumulated as illustrated in FIG. 11A, the second resource R2 may be detected, and thus, the base station 12 may determine the transmission parameters based on feedback information corresponding to the second resource R2. That is, when the reception power $Q_m$ accumulated in the $m^{th}$ resource $R_m$ is expressed as Equation (7) ($1 \le m \le M$), an index m* of a resource recognized by the base station 12 may be expressed as the following Equation (8).

$$m^* = \min\{m | Q_m > THR1, 1 \le m \le M\} \quad \text{[Equation 8]}$$

When the second transmission power level (or reception power of the base station 12 corresponding to the second transmission power level) is zero, the first threshold value THR1 may be greater than zero and less than $\gamma$.

Referring to FIG. 11B, the base station 12 may determine a location of a resource corresponding to a lowest channel condition from among resources having a reception power level which is lower than a second threshold value THR2 and may determine transmission parameters based on the determined location of the resource. For example, when channel feedbacks generated by the first to $p^{th}$ terminals 14_1 to 14_p based on one-cold encoding are accumulated as illustrated in FIG. 11B, the second resource R2 may be detected, and thus, the base station 12 may determine the transmission parameters based on feedback information corresponding to the second resource R2. That is, when the reception power $Q_m$ accumulated in the $m^{th}$ resource $R_m$ is expressed as Equation (7) ($1 \le m \le M$), an index m* of a resource recognized by the base station 12 may be expressed as the following Equation (9).

$$m^* = \min\{m | Q_m < THR2, 1 \le m \le M\} \quad \text{[Equation 9]}$$

When the second transmission power level (or reception power of the base station 12 corresponding to the second transmission power level) is zero, the second threshold value THR2 may be less than $p\gamma$, which is a maximum reception power level (i.e., a reception power level corresponding to reception power into which transmission power having first transmission power levels of the first to $p^{th}$ terminals 14_1 to 14_p are all accumulated), and greater than $(p-1)\gamma$.

Figure 12A:
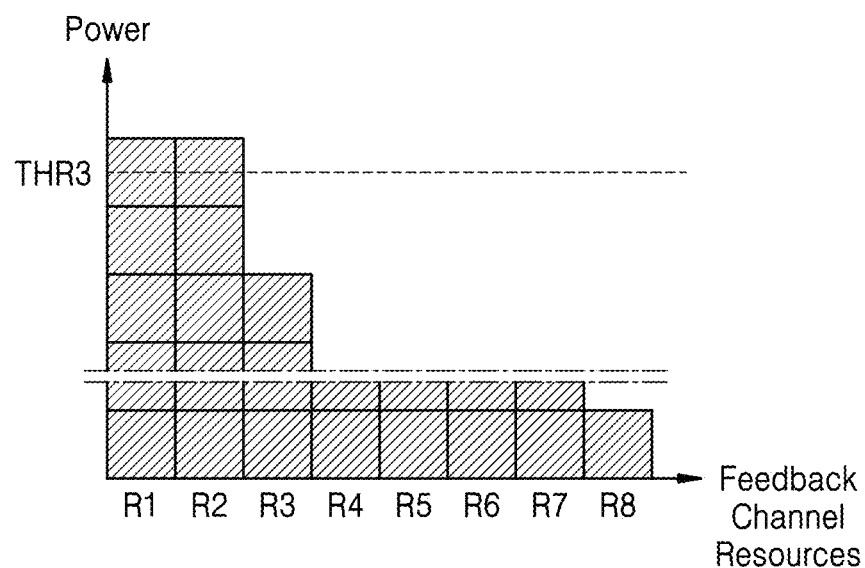
FIGS. 12A and 12B are graphs showing examples of combined channel feedback obtained by a base station according to an example embodiment.
Figure 12B:
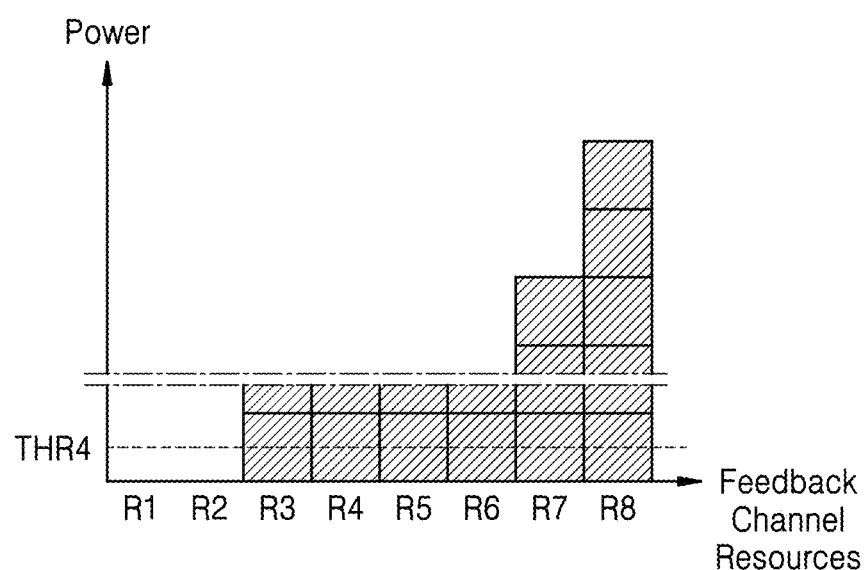

FIGS. 12A and 12B are graphs showing examples of combined channel feedback obtained by a base station according to an example embodiment. In detail, the graph of FIG. 12A shows an example of combined channel feedback from channel feedback generated based on unary coding described above with reference to FIG. 8A, and the graph of FIG. 12B shows an example of combined channel feedback from channel feedbacks generated based on unary coding described above with reference to FIG. 8B. The combined channel feedback of FIG. 12A and the combined channel feedback of FIG. 12B may be processed by the base station 12 of FIG. 1. Hereinafter, FIGS. 12A and 12B will be described with reference to FIG. 1.

Referring to FIG. 12A, the base station 12 may determine a location of a resource corresponding to a best channel condition (i.e., a channel condition corresponding to a best channel) from among resources having a reception power level which is higher than a third threshold value THR3 and may determine transmission parameters based on the determined location of the resource. For example, when channel feedbacks generated by the first to $p^{th}$ terminals 14_1 to 14_p based on unary coding of FIG. 8A are accumulated as illustrated in FIG. 12A, the second resource R2 may be detected, and thus, the base station 12 may determine the transmission parameters based on feedback information corresponding to the second resource R2. That is, when the reception power $Q_m$ accumulated in the $m^{th}$ resource $R_m$ is expressed as Equation (7) ($1 \le m \le M$), an index m* of a resource recognized by the base station 12 may be expressed as the following Equation (10).

$$m^* = \max\{m | Q_m > THR3, 1 \le m \le M\} \quad \text{[Equation 10]}$$

Similarly to the second threshold value THR2 of FIG. 11B, when the second transmission power level (or reception power of the base station 12 corresponding to the second transmission power level) is zero, the third threshold value THR3 may be less than $p\gamma$, which is a maximum reception power level (i.e., a reception power level corresponding to reception power into which transmission power having first transmission power levels of the first to $p^{th}$ terminals 14_1 to 14_p are all accumulated), and greater than $(p-1)\gamma$.

Referring to FIG. 12B, the base station 12 may determine a location of a resource corresponding to a best channel condition from among resources having a reception power level which is lower than a fourth threshold value THR4 and may determine transmission parameters based on the determined location of the resource. For example, when channel feedbacks generated by the first to $p^{th}$ terminals 14_1 to 14_$p$ based on unary coding of FIG. 8B are accumulated as illustrated in FIG. 12B, the second resource R2 may be detected, and thus, the base station 12 may determine the transmission parameters based on feedback information corresponding to the second resource R2. That is, when the reception power $Q_m$ accumulated in the $m^{th}$ resource $R_m$ is expressed as Equation (7) (1≤m≤M), an index m* of a resource recognized by the base station 12 may be expressed as the following Equation (11).

$$m^*=\max\{m|Q_m<\text{THR4},1\le m\le M\} \quad \text{[Equation 11]}$$

Similarly to the first threshold value THR1 of FIG. 11A, when the second transmission power level (or reception power of the base station 12 corresponding to the second transmission power level) is zero, the fourth threshold value THR4 may be greater than zero and less than γ.

Figure 13:
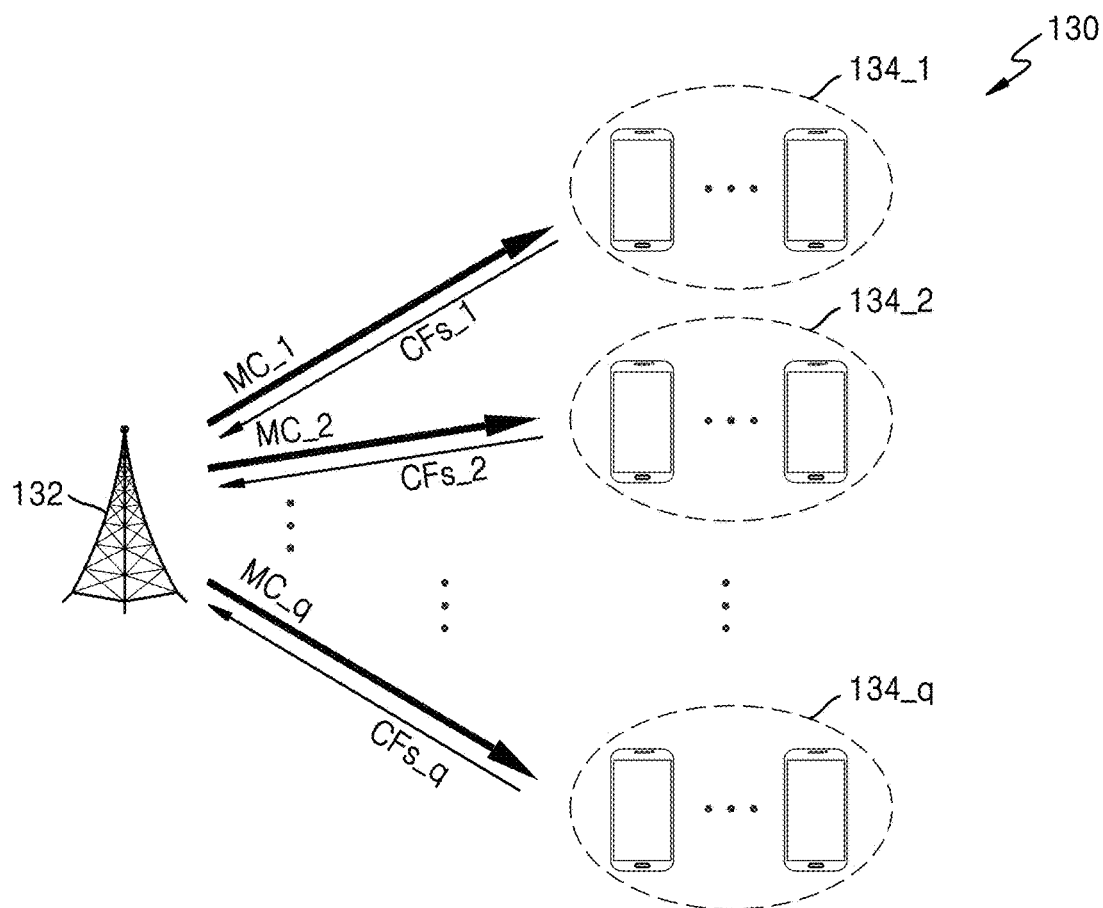
FIG. 13 is a diagram illustrating a wireless communication system according to an example embodiment.

FIG. 13 is a diagram illustrating a wireless communication system 130 according to an example embodiment. As illustrated in FIG. 13, the wireless communication system 130 may include a base station 132 and first to $q^{th}$ multicast groups 134_1 to 134_$q$ (where q is an integer of more than 0).

As described above with reference to the drawings, terminals included in the same multicast group may share a feedback channel and may transmit channel feedbacks on the feedback channel, and thus, the base station 132 may receive combined channel feedback on the feedback channel. For example, as illustrated in FIG. 13, a plurality of terminals included in the first multicast group 134_1 may provide first combined channel feedback CFs_1 to the base station 132 and may receive first multicast transmission MC_1 from the base station 132. A plurality of terminals included in the second multicast group 134_2 may provide second combined channel feedback CFs_2 to the base station 132 and may receive second multicast transmission MC_2 from the base station 132. Also, a plurality of terminals included in the $q^{th}$ multicast group 134_$q$ may provide $q^{th}$ combined channel feedback CFs_q to the base station 132 and may receive $q^{th}$ multicast transmission MC_q from the base station 132.

The feedback channel may be shared by terminals included in the same multicast group and may differ from a feedback channel of another multicast group. To this end, the base station 132 may respectively allocate a plurality of different feedback channels to a plurality of multicast groups. For example, the base station 132 may respectively allocate q different feedback channels to the first to $q^{th}$ multicast groups 134_1 to 134_$q$, for receiving first to $q^{th}$ combined channel feedbacks CFs_1 to CFs_q. Examples of feedback channels capable of being allocated by the base station 132 will be described below with reference to FIG. 14.

Figure 14:
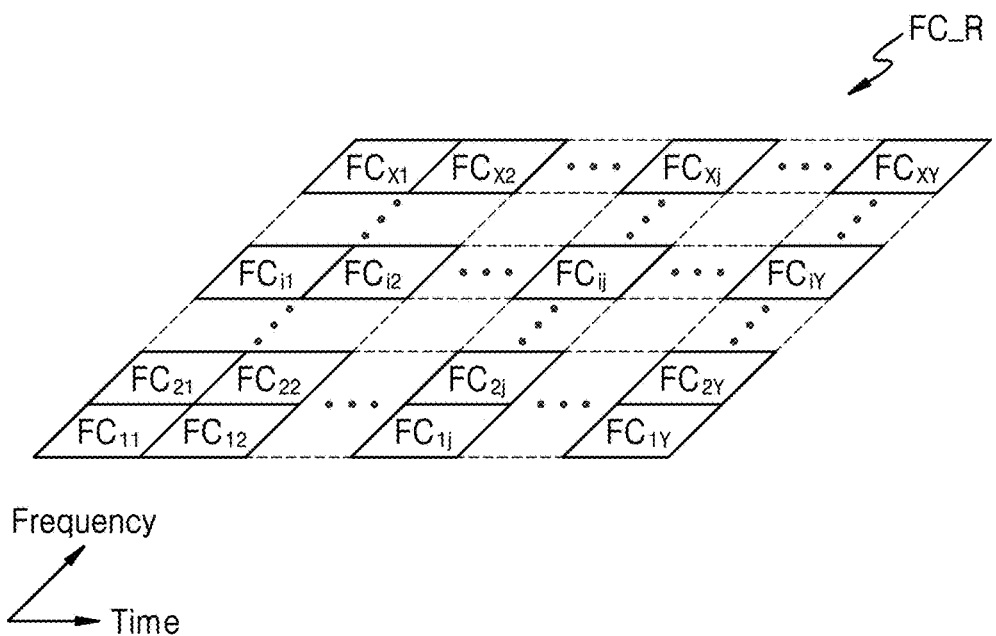
FIG. 14 is a diagram illustrating a physical time-frequency structure for feedback channels according to an example embodiment.

FIG. 14 is a diagram illustrating a physical time-frequency structure for feedback channels according to an example embodiment. As described above with reference to FIG. 13, the base station 132 may respectively allocate q different feedback channels to the first to $q^{th}$ multicast groups 134_1 to 134_$q$. Hereinafter, FIG. 14 will be described with reference to FIG. 13.

Referring to FIG. 14, a feedback channel resource FC R may include a plurality of feedback channels $FC_{11}$ to $FC_{XY}$ capable of allocation (where each X and Y is an integer of more than 1). The base station 132 may allocate a feedback channel, unallocated to another multicast group, of the plurality of feedback channels $FC_{11}$ to $FC_{XY}$ to each of the first to CO multicast groups 134_1 to 134_$q$. Subsequently, as described above with reference to FIG. 2, the base station 132 may transmit allocation information about a feedback channel to each of the first to $q^{th}$ multicast groups 134_1 to 134_$q$. As described above with reference to FIGS. 3A and 3B, each of the feedback channels $FC_{11}$ to $FC_{XY}$ may include M resources divided in a time domain or a frequency domain.

In some example embodiments, the base station 132 may allocate two or more feedback channels to one multicast group. For example, when the number of multicast groups is small, the base station 132 may allocate two or more adjacent feedback channels to a multicast group including a plurality of terminals. Therefore, terminals included in a multicast group with two or more adjacent feedback channels allocated thereto may determine the same transmission power level for two or more successive resources, and thus, the base station 132 may obtain feedback information from combined channel feedback at high accuracy.

Figure 15:
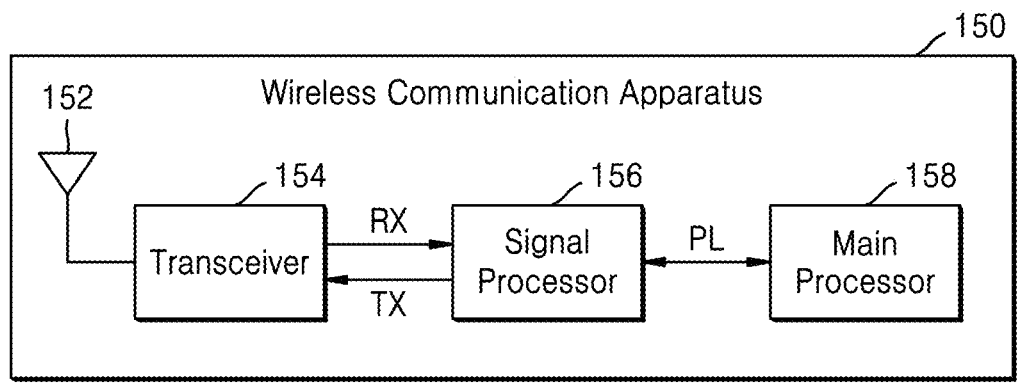
FIG. 15 is a block diagram illustrating a wireless communication apparatus according to an example embodiment.

FIG. 15 is a block diagram illustrating a wireless communication apparatus 150 according to an example embodiment. The wireless communication apparatus 150 may be an example of each of a base station (for example 12 of FIG. 1) and a terminal (for example, 14_1 of FIG. 1). As illustrated in FIG. 15, the wireless communication apparatus 150 may include an antenna module 152, a transceiver 154, a signal processor 156, and a main processor 158.

The antenna module 152 may include a plurality of antennas, for spatial diversity, polarization diversity, and spatial multiplexing. The transceiver 154 may process a transmission signal TX provided from the signal processor 156 to output a radio frequency (RF) signal to the antenna module 152 and may process an RF signal received through the antenna module 152 to provide a reception signal RX to the signal processor 156. In some example embodiments, the transceiver 154 may include a low noise amplifier, a mixer, a filter, and a power amplifier and may be referred to as a radio frequency integrated circuit (RFIC).

The signal processor 156 may generate the transmission signal TX from a payload PL provided by the main processor 158 and may generate the payload PL from the reception signal RX to provide the generated payload PL to the main processor 158. The signal processor 156 may perform operations of forming a communication channel along with another wireless communication apparatus based on a wireless communication system including the wireless communication apparatus 150. In some example embodiments, the signal processor 156 may be referred to as a communication processor, a baseband processor, and a modem. The main processor 158 may generate the payload PL including information which is to be provided to the other wireless communication apparatus, may provide the generated payload PL to the signal processor 156, and may receive the payload PL, including information provided by the other wireless communication apparatus, from the signal processor 156.

The signal processor 156 may perform a method of receiving multicast transmission described above with reference to the drawings. For example, the signal processor 156 may be implemented using processing circuitry such as hardware including logic circuits, a hardware/software combination such as a processor executing software; or a combination thereof. For example, while the processing circuitry is illustrated as being a CPU, the processing circuitry may include, but is not limited to, a CPU, an arithmetic logic unit (ALU), a digital signal processor, a microcomputer, a field programmable gate array (FPGA), a System-on-Chip (SoC) a programmable logic unit, a microprocessor, or an application-specific integrated circuit (ASIC), etc. The processing circuitry may be configured as a special purpose computer to simultaneously obtain a plurality of channel conditions, used for determination of transmission parameters in the multicast/broadcast service, on a feedback channel shared by a plurality of terminals, instead of obtaining the channel conditions from the plurality of terminals and may obtain a worst channel condition (i.e., a lowest channel condition). The processing circuitry may improve the functioning of the wireless communication system 10 itself by determining transmission parameters for multicast transmission MC within a certain time regardless of a variation of the number of terminals included in a multicast group 14, which receives the multicast transmission MC, thus enhancing the efficiency of the multicast/broadcast service.

More specifically, in some example embodiments, the signal processor 156 may perform operations performed by the base station for the multicast transmission. For example, the signal processor 156 may perform operations including operation S10, operation S20, operation S60, and operation S70 of FIG. 2. Also, in some example embodiments, the signal processor 156 may perform operations performed by the terminal for the multicast transmission. For example, the signal processor 156 may perform operations including operation S30, operation S40, and operation S50 of FIG. 2. An example of the signal processor 156 will be described below with reference to FIG. 16.

Figure 16:
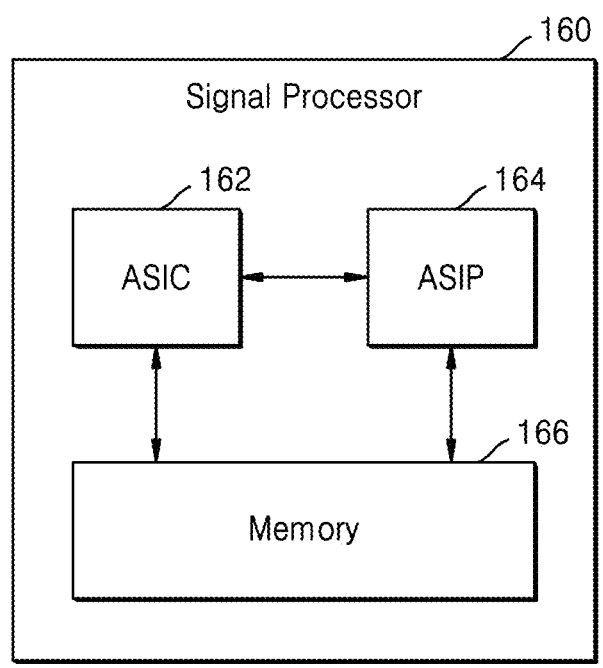
FIG. 16 is a block diagram illustrating a signal processor according to an example embodiment.

FIG. 16 is a block diagram illustrating a signal processor 160 according to an example embodiment.

Referring to FIG. 16, the signal processor 160 may include an application specific integrated circuit (ASIC) 162, an application specific instruction set processor (ASIP) 164, and a memory 166. The ASIC 162, the ASIP 164, and the memory 166 may communicate with one another, and in some example embodiments, may be connected to a bus. Also, at least two of the ASIC 162, the ASIP 164, and the memory 166 may be embedded into a single chip.

The ASIC 162 may include a plurality of function blocks (for example, hardware intellectual properties (IPs) and hardware accelerators) in an integrated circuit designed by a logic combination. The function blocks included in the ASIC 162 may include at least some of operations in the method for multicast transmission described above with reference to the drawings. The ASIC 162 may obtain data, needed for performing an operation, from the memory 166, and after performing an operation, the ASIC 162 may store result data in the memory 166.

The ASIP 164, an integrated circuit customized for the specific purpose, may support a dedicated instruction set for a certain application and may execute instructions in the instruction set. The ASIP 164 may communicate with the memory 166 and may execute a plurality of instructions stored in the memory 166 to perform at least some of the operations in the method for multicast transmission described above with reference to the drawings.

The memory 166, a non-transitory storage device, may communicate with the ASIP 164 and may store the plurality of instructions executed by the ASIP 164. For example, in a non-limiting embodiment, the memory 166 may include an arbitrary-type memory accessible by the ASIP 164 like random access memory (RAM), read only memory (ROM), tape, a magnetic disk, an optical disk, a volatile memory, a non-volatile memory, and a combination thereof.

While example embodiments of the inventive concepts have been particularly shown and described with reference to example embodiments thereof, it will be understood that various changes in form and details may be made therein without departing from the spirit and scope of the following claims.

What is claimed is:

1. A method performed by a terminal to receive multicast transmission from a base station, the method comprising:
   receiving allocation information associated with a feedback channel among a plurality of feedback channels allocated to respective ones of a plurality of multicast groups, the feedback channel including a plurality of resources shared between the terminal and another terminal;
   determining feedback information based on an estimated channel with the base station;
   determining, based on the feedback information, a plurality of transmission power levels corresponding to the plurality of resources shared with the another terminal, respectively;
   transmitting channel feedback to the base station on the feedback channel with transmission powers corresponding to the plurality of transmission power levels for the plurality of resources such that the base station simultaneously receives the channel feedback from the terminal and the another terminal; and
   receiving the multicast transmission from the base station in response to the channel feedback information transmitted thereto such that the channel feedback is utilized by the base station to determine a transmission parameter, and to provide the multicast transmission to the terminal and the another terminal based on the transmission parameter.

2. The method of claim 1, further comprising
   setting a magnitude of a first transmission power level to be inversely proportional to reception power from the base station, wherein
   the determining of the plurality of transmission power levels comprises setting respective ones of the plurality of transmission power levels as the first transmission power level or a second transmission power level based on the feedback information, the second transmission power level being lower than the first transmission power level.

3. The method of claim 2, wherein the setting the respective ones of the plurality of transmission power levels comprises:
   selecting one resource from among the plurality of resources based on the feedback information;
   setting a transmission power level of the selected one resource as the first transmission power level; and
   setting a transmission power level of unselected resources among the plurality of resources as the second transmission power level.

4. The method of claim 2, wherein the setting the respective ones of the plurality of transmission power levels comprises:
   selecting one resource from among the plurality of resources based on the feedback information;
   setting a transmission power level of the selected one resource as the second transmission power level; and
   setting a transmission power level of unselected resources among the plurality of resources as the first transmission power level.

5. The method of claim 2, wherein the setting the respective ones of the plurality of transmission power levels comprises:

selecting at least one resource, which is successive in a frequency domain and/or a time domain, from among the plurality of resources based on the feedback information;

setting a transmission power level of the selected at least one resource as the first transmission power level; and setting a transmission power level of each of unselected resources among the plurality of resources as the second transmission power level.

6. The method of claim 5, wherein the at least one resource includes a first resource of the plurality of resources.

7. The method of claim 5, wherein the at least one resource includes a last resource of the plurality of resources.

8. A method performed by a terminal to provide a base station with channel feedback for multicast transmission, the method comprising:

receiving allocation information associated with a feedback channel among a plurality of feedback channels allocated to respective ones of a plurality of multicast groups, the feedback channel including M resources shared between the terminal and another terminal, wherein M is an integer of more than 1;

determining feedback information based on an estimated channel with the base station;

encoding the feedback information as an M-bit string;

setting, based on the M-bit string, each of M transmission power levels for the M resources as a first transmission power level or a second transmission power level; and transmitting channel feedback to the base station on the feedback channel with transmission powers corresponding to the M transmission power levels for the M resources such that the base station simultaneously receives the channel feedback from the terminal and the another terminal, the channel feedback being utilized by the base station to determine a transmission parameter, and to provide the multicast transmission to the terminal and the another terminal based on the transmission parameter.

9. The method of claim 8, wherein the encoding of the feedback information comprises:

encoding the feedback information to the M-bit string using a one-hot encoding scheme or a one-cold encoding scheme.

10. The method of claim 8, wherein the encoding of the feedback information comprises:

encoding the feedback information to the M-bit string based on a unary coding scheme.

11. The method of claim 8, wherein the determining of the feedback information includes determining a channel quality indicator (CQI) index, and the encoding of the feedback information includes encoding the CQI index as the M-bit string.

12. The method of claim 8, wherein the determining of the feedback information includes determining a modulation and coding scheme (MCS) index, and the encoding of the feedback information includes encoding the MCS index as the M-bit string.

13. The method of claim 8, further comprising extracting, from the allocation information, an encoding scheme performed on the feedback information, and the encoding of the feedback information includes encoding the feedback information as the M-bit string based on the encoding scheme.

14. A method of providing multicast transmission to a plurality of terminals, the method comprising:

allocating different ones of a plurality of feedback channels to respective ones of a plurality of multicast groups;

providing the plurality of terminals with allocation information associated with a feedback channel among the plurality of feedback channels, the feedback channel including a plurality of resources shared with the plurality of terminals;

simultaneously receiving, over the feedback channel, a plurality of channel feedbacks from the plurality of terminals;

determining a transmission parameter based on a plurality of reception power accumulated in the plurality of resources using the plurality of channel feedbacks; and providing the multicast transmission to the plurality of terminals based on the transmission parameter.

15. The method of claim 14, wherein the determining of the transmission parameter comprises:

determining a location of a resource corresponding to a lowest channel condition from among resources having a reception power level greater than or equal to a threshold value; and determining the transmission parameter based on the location of the resource.

16. The method of claim 14, wherein the determining of the transmission parameter comprises:

determining a location of a resource corresponding to a lowest channel condition from among resources having a reception power level which is less than or equal to a threshold value; and determining the transmission parameter based on the location of the resource.

17. The method of claim 14, wherein the determining of the transmission parameter comprises:

determining a location of a resource corresponding to a best channel condition from among resources having a reception power level which is greater than or equal to a threshold value; and determining the transmission parameter based on the location of the resource.

18. The method of claim 14, wherein the determining of the transmission parameter comprises:

determining a location of a resource corresponding to a best channel condition from among resources having a reception power level which is less than or equal to a threshold value; and determining the transmission parameter based on the location of the resource.

19. The method of claim 14, wherein the determining of the transmission parameter comprises:

determining a lowest channel condition from among a plurality of channel conditions corresponding to the plurality of channel feedbacks; and determining the transmission parameter based on the lowest channel condition.

* * * * *